(12) United States Patent
Doshay et al.

(10) Patent No.: US 12,710,573 B2
(45) Date of Patent: Aug. 18, 2026

(54) PHOTORESIST LOADING SOLUTIONS FOR FLAT OPTICS FABRICATION

(71) Applicant: Applied Materials, Inc., Santa Clara, CA (US)

(72) Inventors: Sage Toko Garrett Doshay, Saratoga, CA (US); Rutger Meyer Timmerman Thijssen, Sunnyvale, CA (US); Ludovic Godet, Sunnyvale, CA (US); Chien-An Chen, San Jose, CA (US); Pinkesh Rohit Shah, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 271 days.

(21) Appl. No.: 18/314,953

(22) Filed: May 10, 2023

(65) Prior Publication Data

US 2023/0280511 A1 Sep. 7, 2023

Related U.S. Application Data

(62) Division of application No. 16/880,846, filed on May 21, 2020, now Pat. No. 11,681,083.

(Continued)

(51) Int. Cl.
*G02B 5/20* (2006.01)

(52) U.S. Cl.
CPC .......... *G02B 5/20* (2013.01); *G02B 2207/101* (2013.01)

(58) Field of Classification Search
CPC .... G02B 5/20; G02B 2207/101; G02B 1/002; G02B 6/107; G02B 2006/12035;

(Continued)

(56) References Cited

U.S. PATENT DOCUMENTS 9,196,868 B2 * 11/2015 Young .................... H10K 50/85
10,468,623 B2 * 11/2019 Ajiki .................... H10K 59/122

(Continued)

FOREIGN PATENT DOCUMENTS

CN 102259831 A 11/2011
CN 105319832 A 2/2016

(Continued)

OTHER PUBLICATIONS

International Search Report and Written Opinion for International Application No. PCT/US2020/034054 dated Sep. 11, 2020.

(Continued)

*Primary Examiner* — Tan N Tran
(74) *Attorney, Agent, or Firm* — Patterson + Sheridan, LLP

(57) ABSTRACT

Embodiments of the present disclosure relate to methods for fabricating optical devices. One embodiment of the method includes disposing a structure material layer on a surface of a substrate and disposing a patterned photoresist over the structure material layer. The patterned photoresist has at least one device portion and at least one auxiliary portion. Each device portion and each auxiliary portion exposes unmasked portions of the structure material layer. The unmasked portions of structure material layer corresponding to each device portion and each auxiliary portion are etched. The etching the unmasked portions forms at least one optical device having device structures corresponding to the unmasked portions of at least one device portion and at least one auxiliary region having auxiliary structures corresponding to the unmasked portions of at least one auxiliary portion.

20 Claims, 9 Drawing Sheets

Related U.S. Application Data

(60) Provisional application No. 62/858,708, filed on Jun. 7, 2019.

(58) Field of Classification Search
CPC ........... G02B 2006/12097; G02B 2006/12176; B82Y 40/00; G03F 7/42
See application file for complete search history.

(56) References Cited

U.S. PATENT DOCUMENTS

| | | | |
|---|---|---|---|
| 2007/0285639 A1 | 12/2007 | Liang et al. | |
| 2013/0140269 A1* | 6/2013 | Chiang | G03F 7/0043 977/887 |
| 2014/0001432 A1 | 1/2014 | Hall et al. | |
| 2014/0326988 A1 | 11/2014 | Yamaguchi et al. | |
| 2017/0212285 A1 | 7/2017 | Arbabi et al. | |
| 2018/0231700 A1 | 8/2018 | Ahmed et al. | |
| 2018/0348548 A1 | 12/2018 | Visser et al. | |
| 2019/0033683 A1 | 1/2019 | Ahmed et al. | |
| 2019/0044003 A1 | 2/2019 | Heck et al. | |
| 2019/0318957 A1 | 10/2019 | Godet et al. | |
| 2020/0166783 A1 | 5/2020 | Roy et al. | |

FOREIGN PATENT DOCUMENTS

| | | | |
|---|---|---|---|
| EP | 1041405 | A1 | 10/2000 |
| JP | 2000-275405 | A | 10/2000 |
| KR | 20100106456 | A | 10/2010 |
| TW | 201333544 | A | 8/2013 |
| TW | 201903472 | A | 1/2019 |

OTHER PUBLICATIONS

Taiwan Office Action dated May 21, 2021 re Taiwan Application No. 109118563.
European Search Report for Application No. 20817887.1 dated Jun. 15, 2023.
Japanese Office Action dated Aug. 6, 2024 for Application No. 2021-572417.
Korean Office Action dated Mar. 11, 2024 for Application No. 10-2022-7000325.
Japanese Office Action dated Jan. 9, 2024 for Application No. 2021-572417.
Chinese Office Action dated May 9, 2025 for Application No. 202080040885.1.
European Office Action Dated Oct. 24, 2025 For Application No. 20817887.
Chinese Office Action Dated Sep. 26, 2025 For Application No. 202080040885.

* cited by examiner 5D
510
508
512
511
506
201
505
204
517
5D 5E
510
508
512
506
201
203
5E 5F
521
510
500
516
512
201
207
203
213
500
5F

PHOTORESIST LOADING SOLUTIONS FOR FLAT OPTICS FABRICATION

CROSS-REFERENCE TO RELATED APPLICATIONS

This application is a divisional application of U.S. patent application Ser. No. 16/880,846, filed May 21, 2020, which claims priority to U.S. Provisional Patent Application Ser. No. 62/858,708, filed on Jun. 7, 2019. Each of the aforementioned related patent applications is herein incorporated by reference.

BACKGROUND

Field

Embodiments of the present disclosure generally relate to optical devices. More specifically, embodiments described herein provide for the fabrication of one or more optical devices.

Description of the Related Art

Optical devices may be used to manipulate the propagation of light. One example of optical devices is flat optical devices. Flat optical devices in the visible and near-infrared spectrum may require transparent substrates having structures, such as nanostructures, disposed thereon. However, processing transparent substrates to form optical devices is both complex and challenging as an emerging technology. For example, large areas of the structure material may be etched away in the areas between adjacent optical devices and between the optical devices and a periphery of the substrate, such that the optical devices are only surrounded by the surface of the substrate. Surrounding the optical devices only by the surface of the substrate results in an inability to determine the endpoint of etch processes which can result in an undesirable critical dimension of the structures.

Accordingly, what is needed in the art are improved methods for fabricating optical devices.

SUMMARY

In one embodiment, a method is provided. The method includes disposing a structure material layer on a surface of a substrate and disposing a patterned photoresist over the structure material layer. The patterned photoresist has at least one device portion and at least one auxiliary portion. Each device portion and each auxiliary portion exposes unmasked portions of the structure material layer. The unmasked portions of structure material layer corresponding to each device portion and each auxiliary portion are etched. The etching the unmasked portions forms at least one optical device having device structures corresponding to the unmasked portions of at least one device portion and at least one auxiliary region having auxiliary structures corresponding to the unmasked portions of at least one auxiliary portion.

In another embodiment, a method is provided. The method includes disposing a structure material layer on a surface of a substrate and disposing a patterned photoresist over the structure material layer. The patterned photoresist has at least one device portion exposing unmasked device portions of the structure material layer, at least one auxiliary portion masking at least one auxiliary region of the substrate, the auxiliary region defined by an intermediate region to be formed and a periphery of the substrate, and at least one intermediate portion exposing unmasked intermediate portions of the structure material layer between each device portion and each auxiliary portion. The unmasked device portions and unmasked intermediate portions of the structure material layer corresponding to each device portion and each intermediate portion are etched. The etching the unmasked device portions and unmasked intermediate portions forms at least one optical device having device structures corresponding to the unmasked portions of at least one device portion and at least one intermediate region between each optical device and each auxiliary region exposing the surface of the substrate. The auxiliary region is masked by each auxiliary portion.

In yet another embodiment, a method is provided. The method includes disposing a structure material layer on a surface of a substrate and disposing a patterned photoresist over the structure material layer. The patterned photoresist has at least one device portion exposing unmasked device portions of the structure material layer and at least one auxiliary portion masking at least one auxiliary region of the substrate. The auxiliary region is defined by an intermediate region to be formed and a periphery of the substrate, and at least one intermediate portion exposing unmasked intermediate portions of the structure material layer between each device portion and each auxiliary portion. An unmasked distance between each device portion and each auxiliary portion is varied. The unmasked device portions and unmasked intermediate portions of the structure material layer corresponding to each device portion and each intermediate portion is etched. The etching the unmasked device portions and unmasked intermediate portions forms at least one optical device having device structures corresponding to the unmasked portions of at least one device portion and at least one intermediate region between each optical device and each auxiliary region exposing the surface of the substrate. The auxiliary region is masked by each auxiliary portion and an exposed distance between each intermediate region and each auxiliary portion is varied.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure relate to methods for fabricating optical devices. One embodiment of the method includes disposing a structure material layer on a surface of a substrate and disposing a patterned photoresist over the structure material layer. The patterned photoresist has at least one device portion and at least one auxiliary portion. Each device portion and each auxiliary portion exposes unmasked portions of the structure material layer. The unmasked portions of structure material layer corresponding to each device portion and each auxiliary portion are etched. The etching the unmasked portions forms at least one optical device having device structures corresponding to the unmasked portions of at least one device portion and at least one auxiliary region having auxiliary structures corresponding to the unmasked portions of at least one auxiliary portion.

Figure 1:
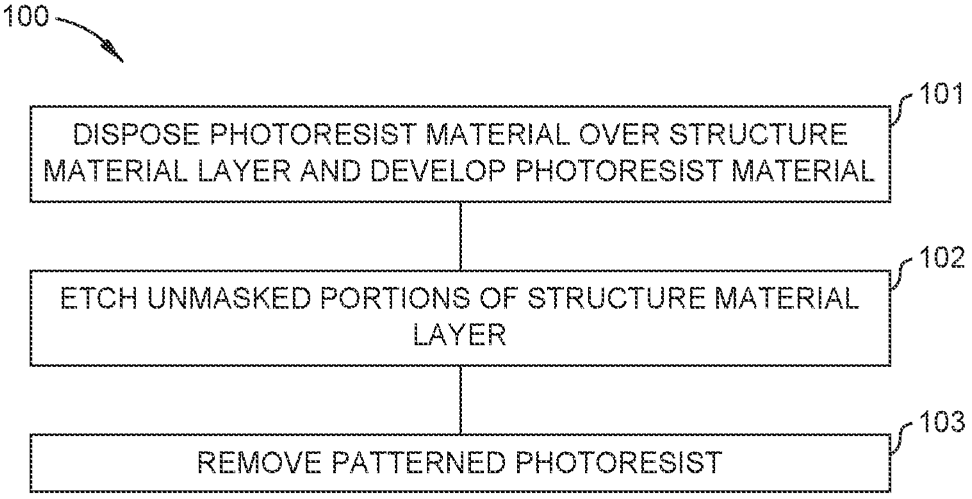
FIG. 1 is a flow diagram illustrating operations of a method for fabricating one or more optical devices according to embodiments.
Figures 2A, 2B, 2C:
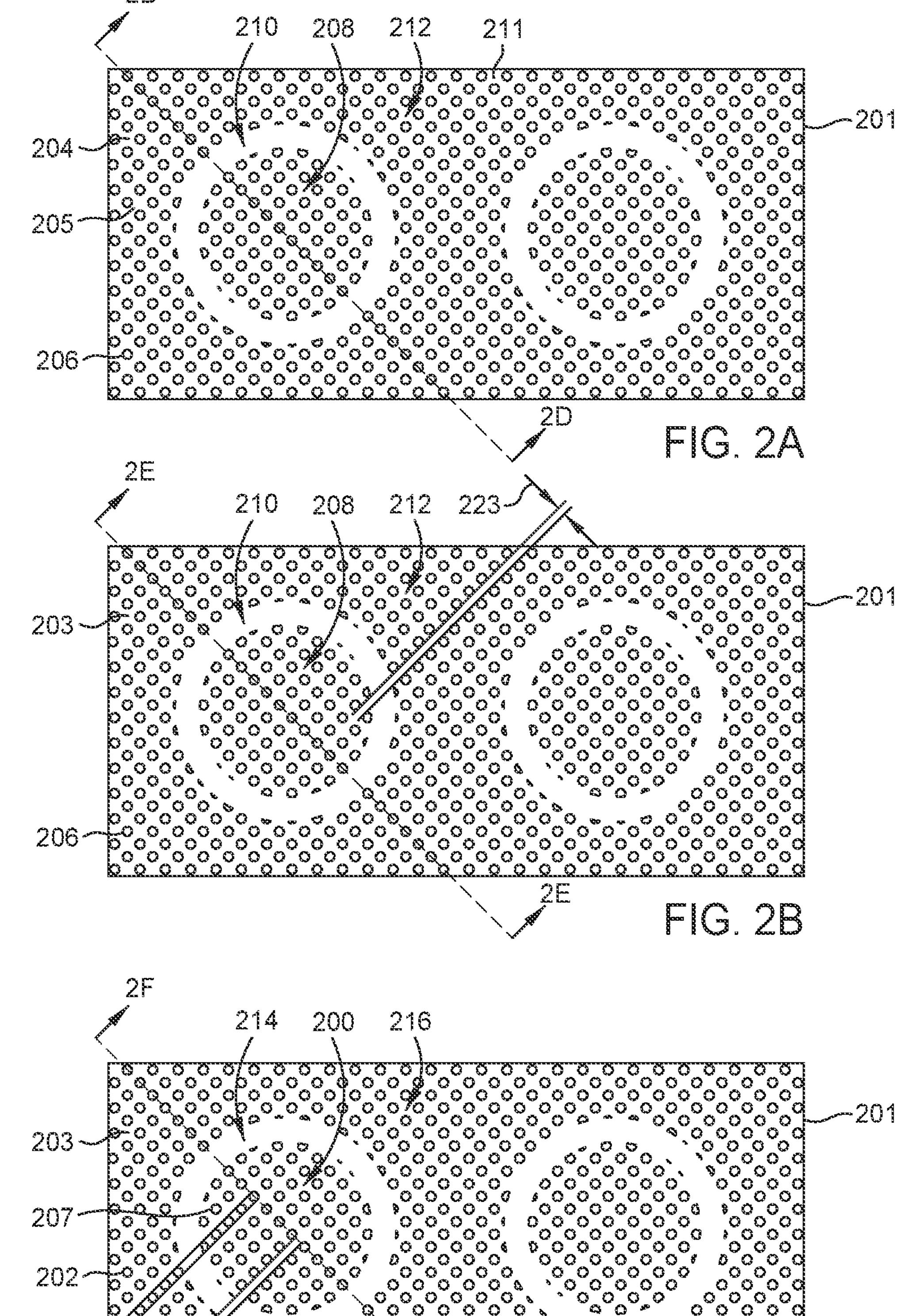
FIGS. 2A-2C are schematic, top views of a substrate during the method for fabricating the optical devices according to an embodiment.
Figure 2D:
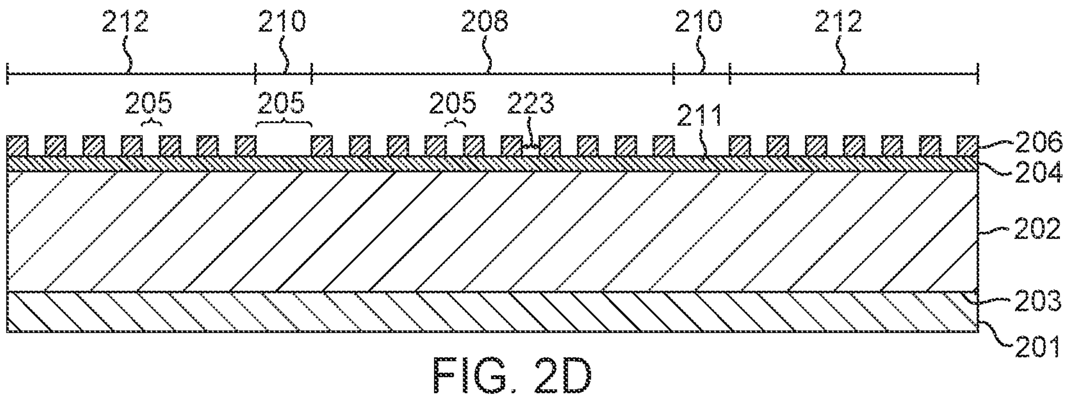
FIGS. 2D-2F are schematic, cross-sectional views of a substrate during the method for fabricating the optical devices according to an embodiment.
Figure 2E:
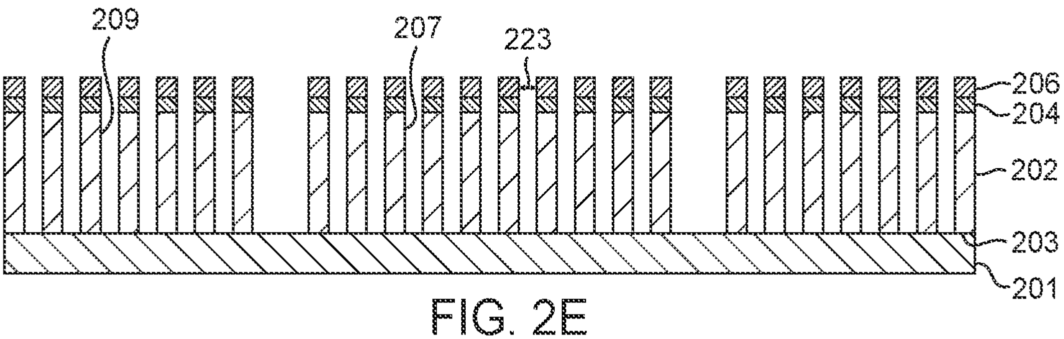
Figure 2F:
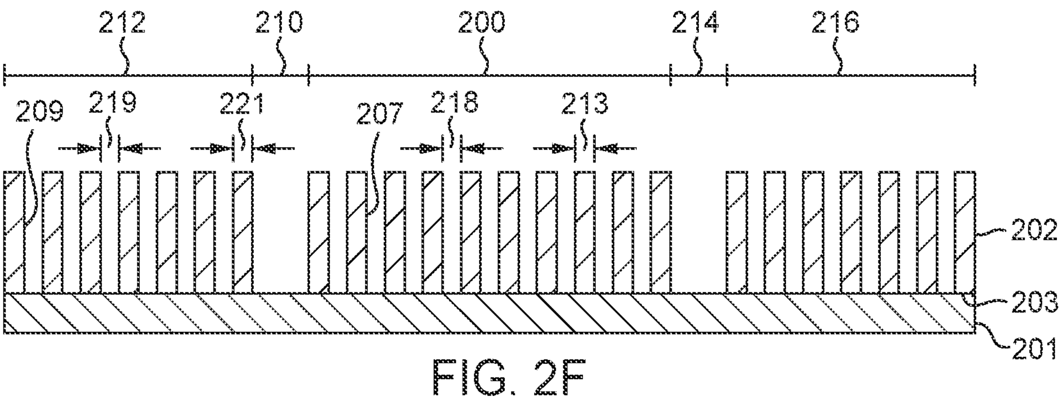
Figures 3A, 3B, 3C:
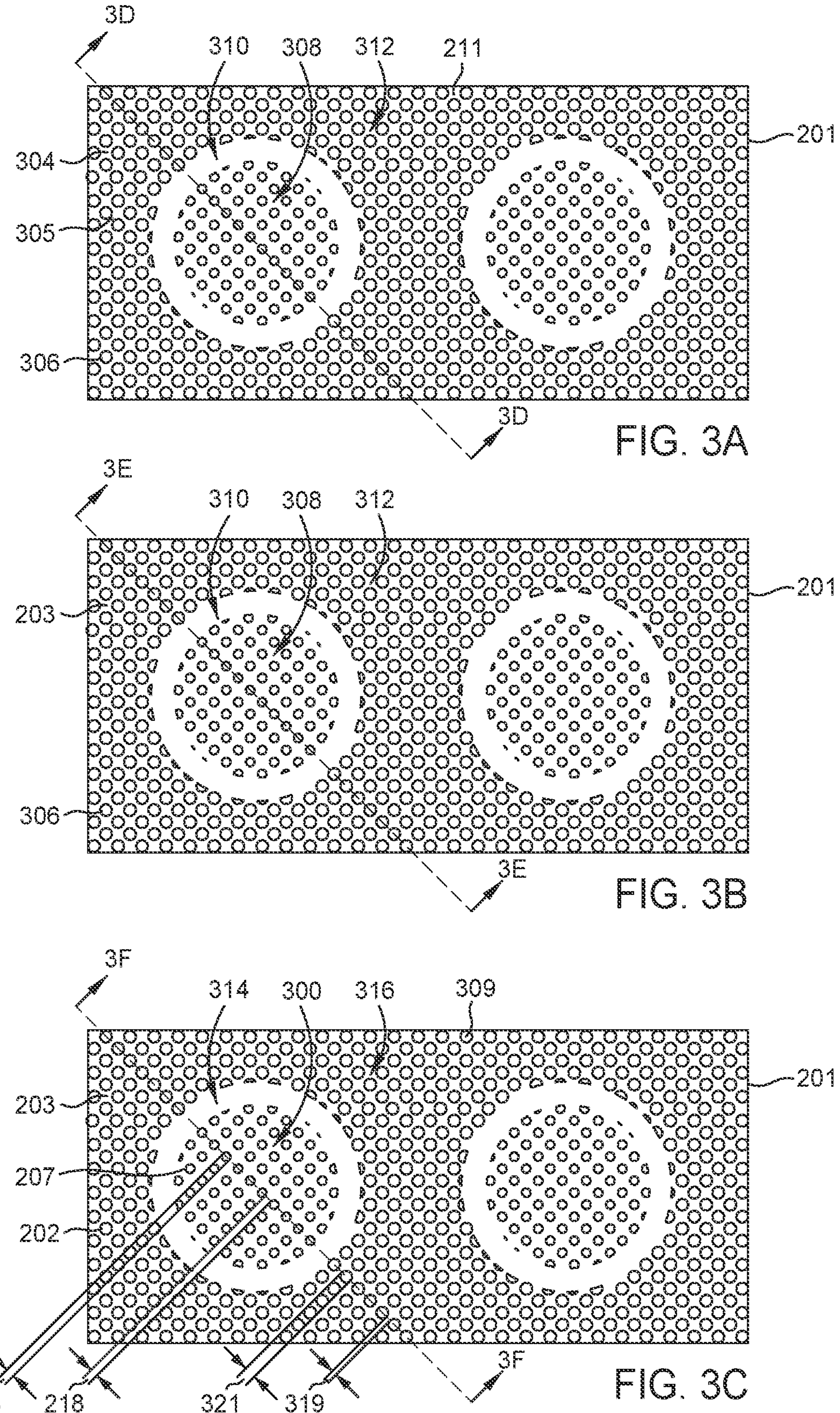
FIGS. 3A-3C are schematic, top views of a substrate during the method for fabricating the optical devices according to an embodiment.
Figure 3D:
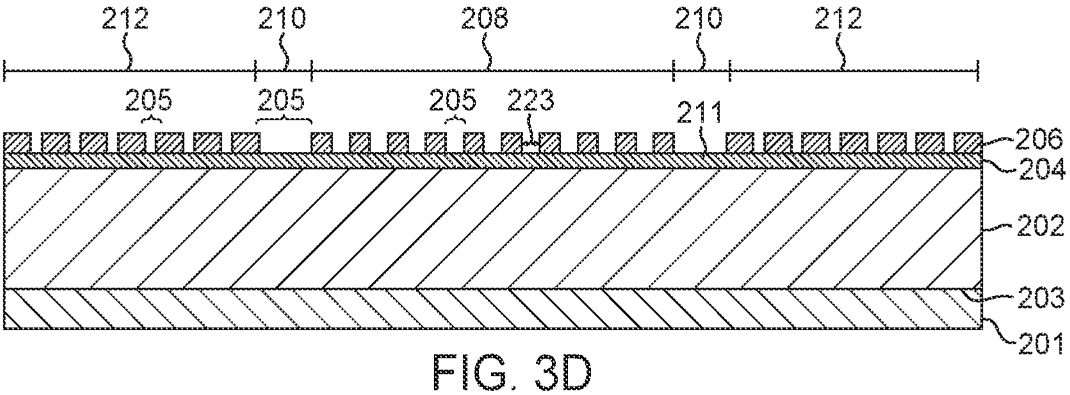
FIGS. 3D-3F are schematic, cross-sectional views of a substrate during the method for fabricating the optical devices according to an embodiment.
Figure 3E:
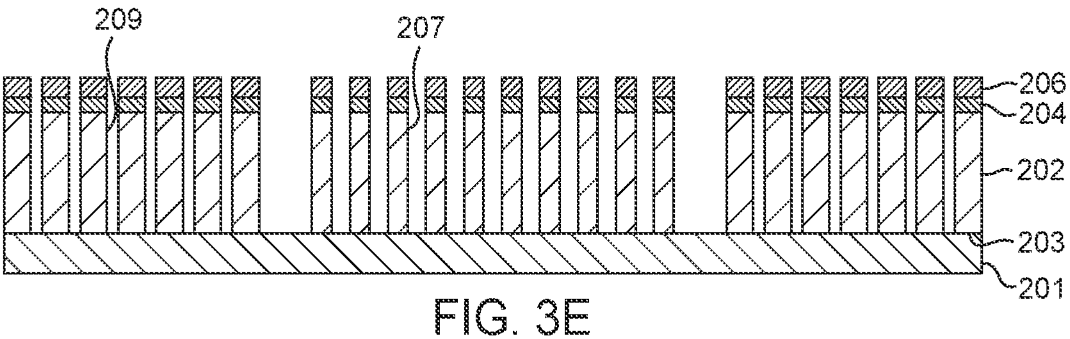
Figure 3F:
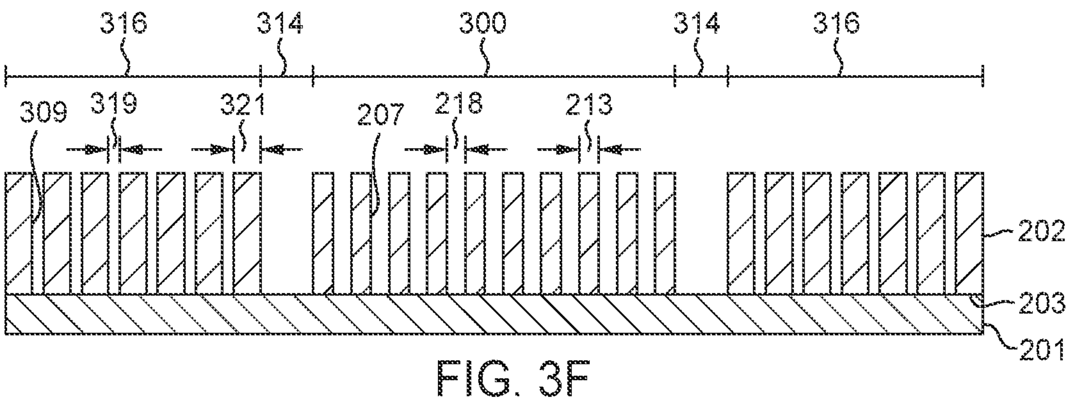

FIG. 1 is a flow diagram illustrating operations of a method 100 for fabricating one or more optical devices 200, 300. FIGS. 2A-2C are schematic, top views of a substrate 201, and FIGS. 2D-2F are schematic, cross-sectional views of a substrate 201 during the method 100 for fabricating the optical devices 200 according to one embodiment, which can be combined with other embodiments described herein. FIGS. 3A-3C are schematic, top views of a substrate 201, and FIGS. 3D-3F are schematic, cross-sectional views of a substrate 201 during the method 100 for fabricating the optical devices 300 according to another embodiment, which can be combined with other embodiments described herein.

At operation 101, as shown in FIGS. 2A and 2D, and FIGS. 3A and 3D, a photoresist material is disposed over a structure material layer 202. The structure material layer 202 is disposed over a surface 203 of the substrate 201. The photoresist material is developed to form patterned photoresist 206, 306. The photoresist material may be disposed over the structure material layer 202 using a spin-on coating process. The patterned photoresist 206, 306 may include, but is not limited to, light-sensitive polymer containing materials. Developing the photoresist material may include performing a lithography process, such as photolithography and digital lithography.

The substrate 201 may also be selected to transmit a suitable amount of light of a desired wavelength or wavelength range, such as one or more wavelengths from about 100 to about 3000 nanometers. Without limitation, in some embodiments, the substrate 201 is configured such that the substrate 201 transmits greater than or equal to about 50%, 60%, 70%, 80%, 90%, 95%, 99%, of an IR to UV region of the light spectrum. The substrate 201 may be formed from any suitable material, provided that the substrate 201 can adequately transmit light in a desired wavelength or wavelength range and can serve as an adequate support for the optical devices. In some embodiments, which can be combined with other embodiments described herein, the material of substrate 201 has a refractive index that is relatively low, as compared to the refractive index of the structure material layer 202. Substrate selection may include substrates of any suitable material, including, but not limited to, amorphous dielectrics, non-amorphous dielectrics, crystalline dielectrics, silicon oxide, polymers, and combinations thereof. In some embodiments, which can be combined with other embodiments described herein, the substrate 201 includes a transparent material. In one embodiment, which can be combined with other embodiments described herein, the substrate 201 is transparent with absorption coefficient smaller than 0.001. Suitable examples may include an oxide, sulfide, phosphide, telluride or combinations thereof. In one example, the substrate 201 includes silicon (Si), silicon dioxide ($SiO_2$), sapphire, and high-index transparent materials containing materials.

The structure material layer 202 may be disposed over the surface 203 of the substrate 201 using a liquid material pour casting process, a spin-on coating process, a liquid spray coating process, a dry powder coating process, a screen printing process, a doctor blading process, a physical vapor deposition (PVD) process, a chemical vapor deposition (CVD) process, a plasma-enhanced (PECVD) process, a flowable CVD (FCVD) process, an atomic layer deposition (ALD) process, evaporation process, or sputtering process. In one embodiment, which can be combined with other embodiments described herein, the structure material layer 202, includes metal-containing dielectric materials not limited to titanium dioxide ($TiO_2$), zinc oxide (ZnO), tin dioxide ($SnO_2$), aluminum-doped zinc oxide (AZO), fluorine-doped tin oxide (FTO), cadmium stannate (tin oxide) (CTO), niobium oxide ($Nb_2O_5$), and zinc stannate (tin oxide) ($SnZnO_3$) containing materials. In another embodiment, which can be combined with other embodiments described herein, the structure material includes non-conductive non-crystalline materials, such as dielectric materials. The dielectric materials may include amorphous dielectrics, non-amorphous dielectrics, and crystalline dielectrics. Examples of the dielectric materials include, but are not limited to, Si containing materials, such as silicon nitride ($Si_3N_4$) and amorphous silicon (a-Si).

In one embodiment, which can be combined with other embodiments described herein, at operation 101, the patterned photoresist 206, 306 is disposed over one or more etch layers 204, such as hardmasks or etch stop layers, disposed over the structure material layer 202. The hardmasks may be disposed over the structure material layer 202 using a liquid material pour casting process, a spin-on coating process, a liquid spray coating process, a dry powder coating process, a screen printing process, a doctor blading process, a PVD process, a CVD process, a PECVD process, a FCVD process, an ALD process, evaporation process, or sputtering process. In one embodiment, the hardmasks are non-transparent hardmasks that are removed after the one or more optical devices 200 are formed. In another embodiment, the hardmasks are transparent hardmasks. Examples of the hardmasks include, but are not limited to, chromium (Cr), silver (Ag), $Si_3N_4$, $SiO_2$, TiN and carbon (C) containing materials.

In one embodiment, which can be combined with other embodiments described herein, the patterned photoresist 206, 306 includes at least one device portion 208, 308 and at least one auxiliary portion 212, 312. In another embodiment, which can be combined with other embodiments described herein, the patterned photoresist 206, 306 includes at least one device portion 208, 308, at least one intermediate portion 210, 310, and at least one auxiliary portion 212, 312. Each intermediate portion 210, 310 is between the device portion 208, 308 and the auxiliary portion 212, 312. Each of the least one device portion 208, 308, the at least one intermediate portion 210, 310, and the at least one auxiliary portion 212, 312, exposes unmasked portions 205, 305 of the structure material layer 202. As shown in FIGS. 2C and 2F, and FIGS. 3C and 3F, each device portion 208, 308 corresponds to one of the optical devices 200, 300 having arrays of device structures 207 formed on or are integral with a surface 203 of substrate 201. Each intermediate portion 210, 310 corresponds to an intermediate region 214, 314 between the optical devices 200, 300 and an auxiliary region 216, 316. Each auxiliary portion 212, 312 corresponds to the auxiliary region 216, 316 of the substrate 201 having arrays of auxiliary structures 209, 309 also known as dummy structures described in detail herein, formed on or are integral with a surface 203 of substrate 201. The auxiliary region 216, 316 is defined by a space defined by each intermediate region 214, 314 and a periphery of the substrate 201.

At operation 102, as shown in FIGS. 2B and 2E, and FIGS. 3B and 3E, the unmasked portions 205, 305 of the structure material layer 202 are etched. The etching the unmasked portions 205, 305 of the structure material layer 202 includes at least one a dry etching process not limited to at least one of ion implantation, ion etching, reactive ion etching (RIE), directional RIE, plasma etching, and wet etching. Etching the unmasked portions 205, 305 forms the device structures 207 of the optical device 200, 300, exposes the surface 203 of substrate 201 in the intermediate region 214, 314, and auxiliary structures 209, 309 of the auxiliary region 216, 316. In one embodiment, which can be combined with other embodiments described herein, unmasked portions 211 of the one or more etch layers 204 are etched prior to the unmasked portions 205, 305 of the structure material layer 202. In one embodiment, which can be combined with other embodiments described herein, at least one of the etch layers 204 has a greater etch selectivity than the structure material layer 202. At operation 103, as shown in FIGS. 2C and 2F, and FIGS. 3C and 3F, the patterned photoresist 206, 306 is removed. Removing the patterned photoresist 206, 306 may include a lithography process or etching process described herein. In the embodiments with the one or more etch layers 204, the one or more etch layers 204 are removed. Removing the one or more etch layers 204 may include ion etching, RIE, or selective wet chemical etching.

In one embodiment, which can be combined with other embodiments described herein, the device structures 207 may have the same dimensions, such as height and width. In another embodiment, which can be combined with other embodiments described herein, at least one of the device structures 207 may have at least one different dimension, such as one of height and width, from the dimensions of additional structures of the device structures 207. In some embodiments described herein, the width of each of the device structures 207 is a critical dimension 213. In some embodiments described herein, the width of each of the auxiliary structures 209, 309 is a critical dimension 221, 321. In one embodiment, which can be combined with other embodiments described herein, the device structures 207 may have the same refractive index. In another embodiment, which can be combined with other embodiments described herein, at least one of the device structures 207 may have a different refractive index than the refractive index of additional structures of the device structures 207. In some embodiments, which can be combined with other embodiments described herein, the optical devices 200, 300 are metasurfaces having the device structures 207 that are nanostructures in the form of nanoscale features. In one example, the nanostructures has a critical dimension 213, 313 less than about 1000 nm, for example, less than about 500 nm, less than about 200 nm, less than about 100 nm or even less than about 20 nm.

The device structures 207 have a device gap 218 defined as a distance between adjacent device structures 207. In one embodiment, which can be combined with other embodiments described herein, the device gap 218 of each of device structures 207 may be substantially the same. In another embodiment, which can be combined with other embodiments described herein, at least one of the device structures 207 may have at least one different device gap 218. The auxiliary structures 209, 309 have an auxiliary gap 219, 319 defined as a distance between adjacent auxiliary structures 307, 309. In one embodiment, which can be combined with other embodiments described herein, the auxiliary gap 219, 319 of each of auxiliary structures 209, 309 may be substantially the same. In another embodiment, which can be combined with other embodiments described herein, at least one of the auxiliary structures 209, 309 may have at least one different auxiliary gap 219, 319.

The method 100 forms one or more optical devices 200 over the substrate 201 separated from the auxiliary region 216 by the intermediate region 214. The optical devices 200 have a relationship between the critical dimension 213 of the device structures 207 and of the critical dimension 221 of the auxiliary structures 209. For portions of the optical devices 200 and the auxiliary region 216 having a device gap 218 and auxiliary gap 219 that are substantially the same, the critical dimension 213 of the device structures 207 and of the critical dimension 221 of the auxiliary structures 209 are substantially the same. The substantially equal critical dimension 213 and critical dimension 221 of portions having the substantially equal device gap 218 and auxiliary gap 219 provides control of load dependence during the etching of the unmasked portions 205 of the structure material layer 202. Load dependence denotes the relationship between loading of the patterned photoresist 206, 306, i.e., exposure area of the unmasked portions 205, and the etch rate of the structure material layer 202.

For the critical dimension 213 of the device structures 207 and of the critical dimension 221 of the auxiliary structures 209 to be substantially equal, a width 223 of the unmasked portions 205 is substantially the same for both the device portion 208 and the auxiliary portion 212 corresponding to portions of the optical devices 200 and the auxiliary region 216 having the device gap 218 and auxiliary gap 219 that are substantially the same. The device portion 208 and the auxiliary portion 212 having the substantially equal width 223 of the unmasked portions 205 provides constant loading of the patterned photoresist 206. The constant loading provides for endpoint detection during the etching of operation 102 and provides for a critical dimension 213 of the device structures 207 less than about 1000 nm, for example, less than about 500 nm, less than about 200 nm, less than about 100 nm or even less than about 20 nm. Endpoint detection provides the ability to end the etching of operation 102 as soon as the device structures 207 are formed such that the critical dimension 213 and sidewall profile of the device structures 207 is maintained. As a result of the constant loading of the patterned photoresist 206, 306, the critical dimension 213 is substantially the same for the device structures 207 and auxiliary structures 209. The critical dimension 213 is controlled such that auxiliary structures 209 reduce or obstruct optical interaction of beams with the substrate and the optical devices 200.

The method 100 forms one or more optical devices 300 over the substrate 201 separated from the auxiliary region 316 by the intermediate region 314. The optical devices 300 have a relationship between the critical dimension 213 of the device structures 207 and of the critical dimension 321 of the auxiliary structures 309. For portions of the optical devices 300 and the auxiliary region 316 having a device gap 218 and auxiliary gap 319 that are substantially the same, the critical dimension 213 of the device structures 207 is less than the critical dimension 321 of the auxiliary structures 309. The critical dimension 213 of the device structures 207 less than the critical dimension 321 of the auxiliary structures 309 provides substantially constant loading of the patterned photoresist 306. The substantially constant loading provides for endpoint detection during the etching of operation 102 and provides for a critical dimension 213 of the device structures 207 less than about 1000 nm, for example, less than about 500 nm, less than about 200 nm, less than about 100 nm or even less than about 20 nm. As a result of the substantially constant loading of the patterned photoresist 306, the critical dimension 213 of the device structures 207 is less than a critical dimension 315 of the auxiliary structures 309 and sidewall profile of the device structures 207 is maintained. The critical dimension 315 is controlled such that auxiliary structures 309 reduce or obstruct optical interaction of beams with the substrate and the optical devices 300.

Figure 4:
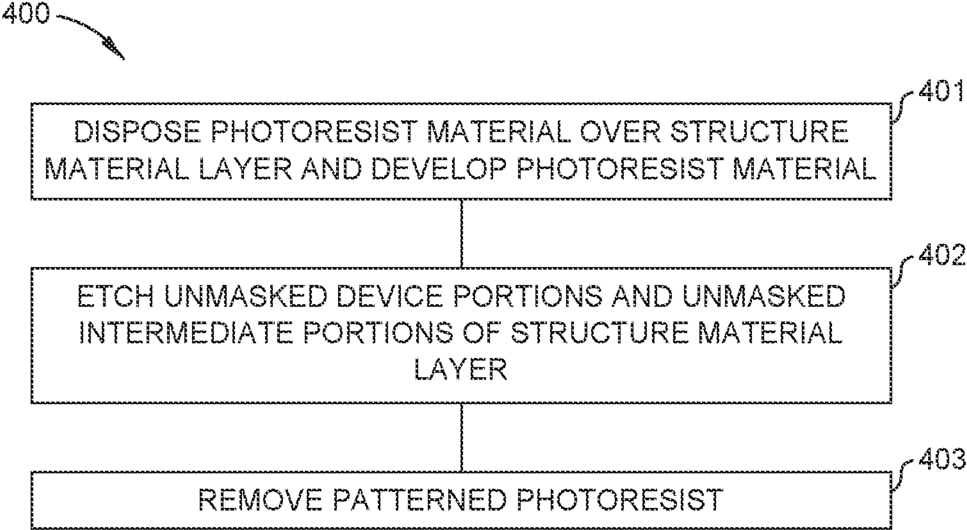
FIG. 4 is a flow diagram illustrating operations of a method for fabricating one or more optical devices according to embodiments.
Figures 5A, 5B, 5C:
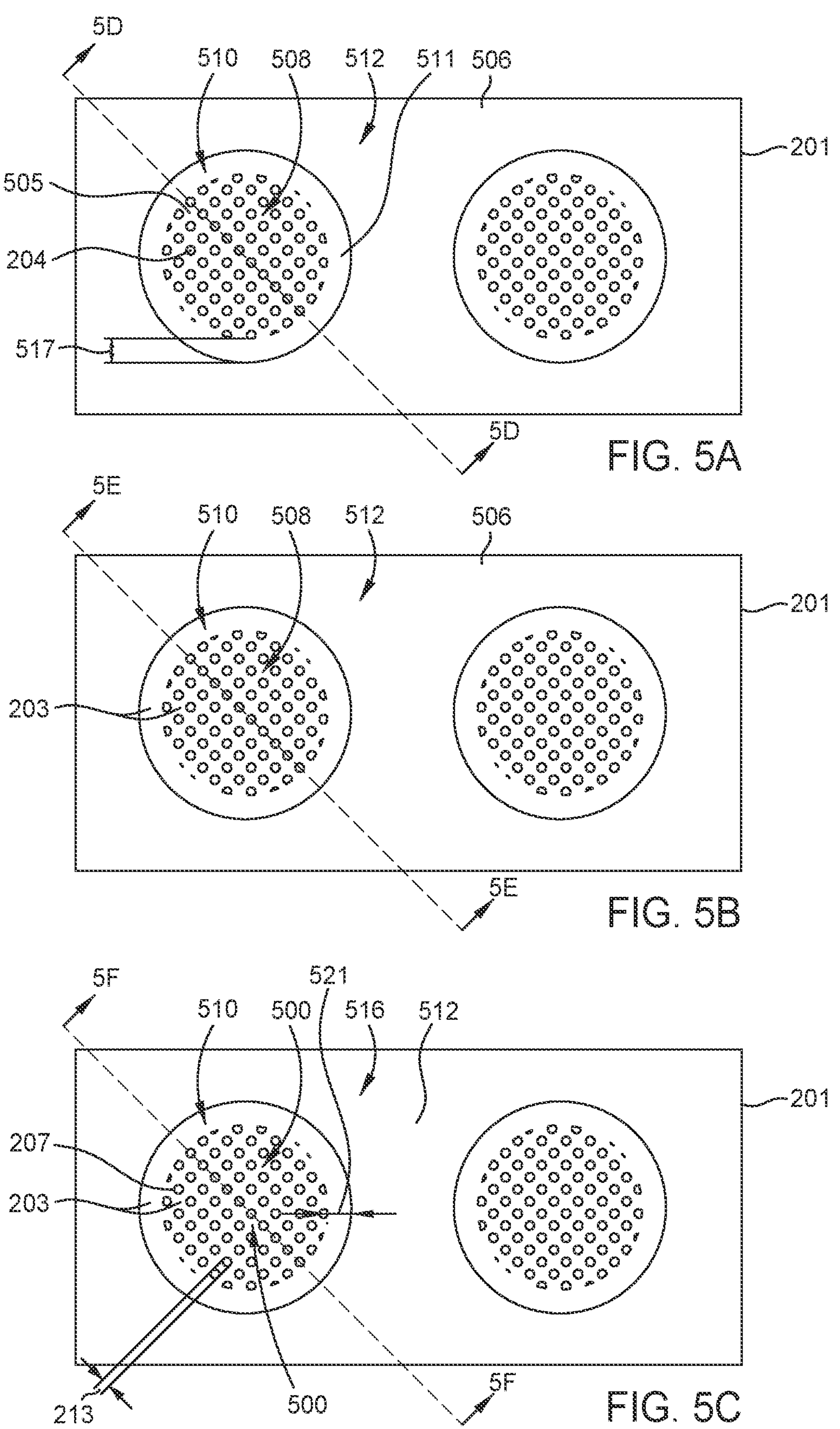
FIGS. 5A-5C are schematic, top views of a substrate during the method for fabricating the optical devices according to an embodiment.
Figure 5D:
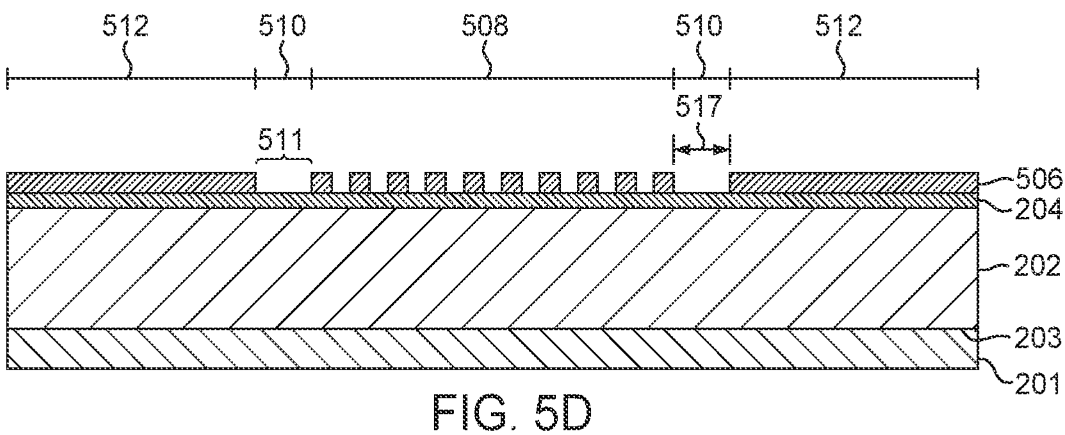
FIGS. 5D-5F are schematic, cross-sectional views of a substrate during the method for fabricating the optical devices according to an embodiment.
Figure 5E:
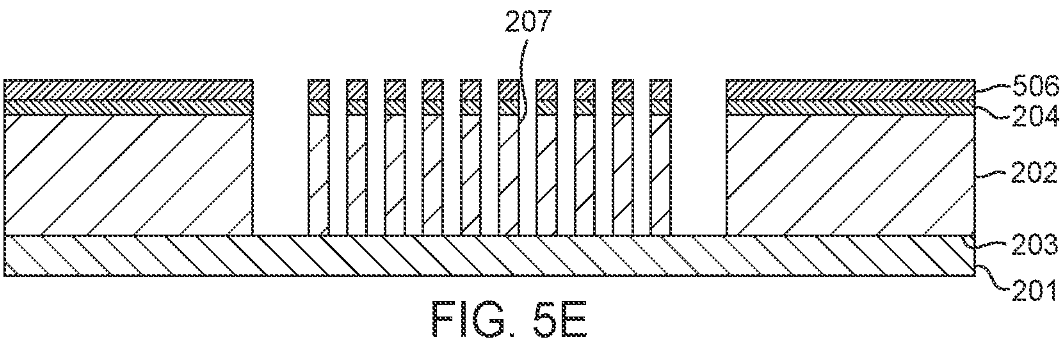
Figure 5F:
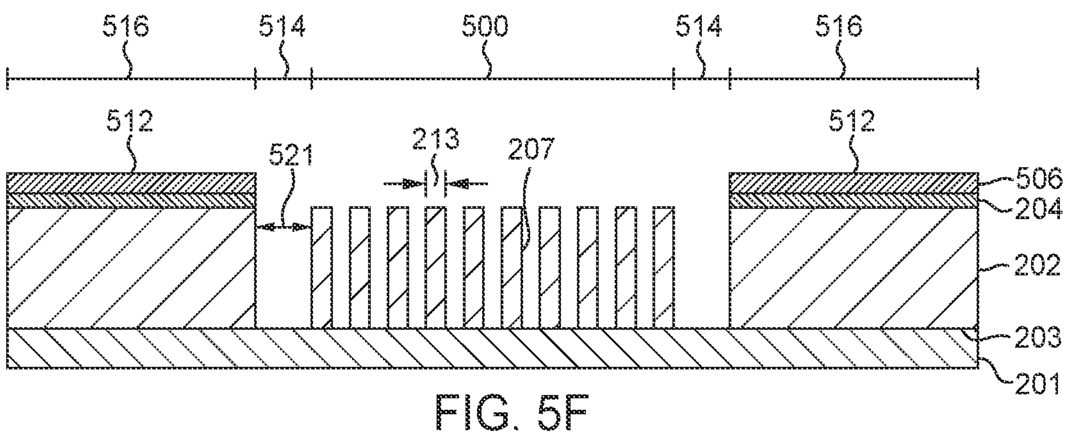
Figures 6A, 6B, 6C:
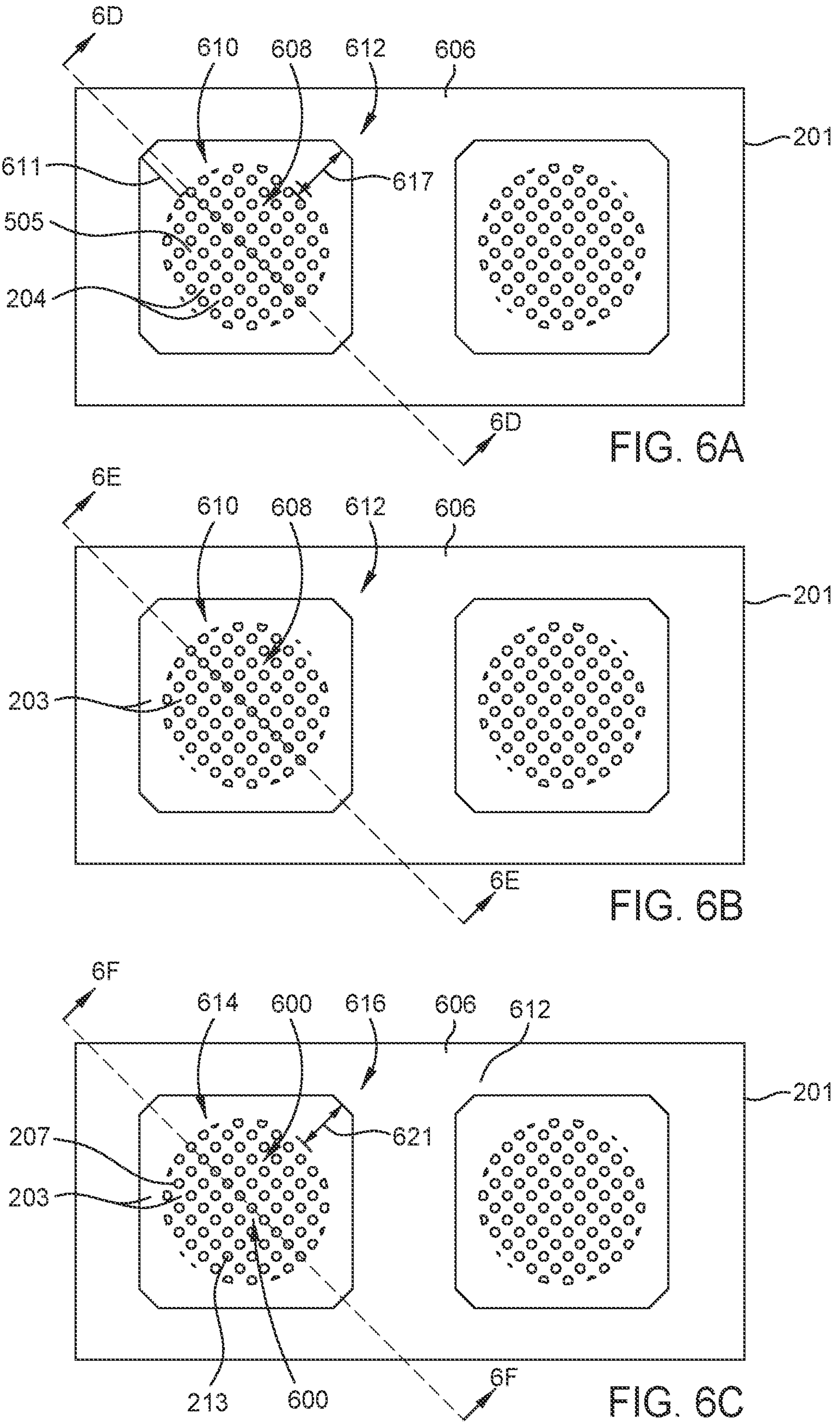
FIGS. 6A-6C are schematic, top views of a substrate during the method for fabricating the optical devices according to an embodiment.
Figure 6D:
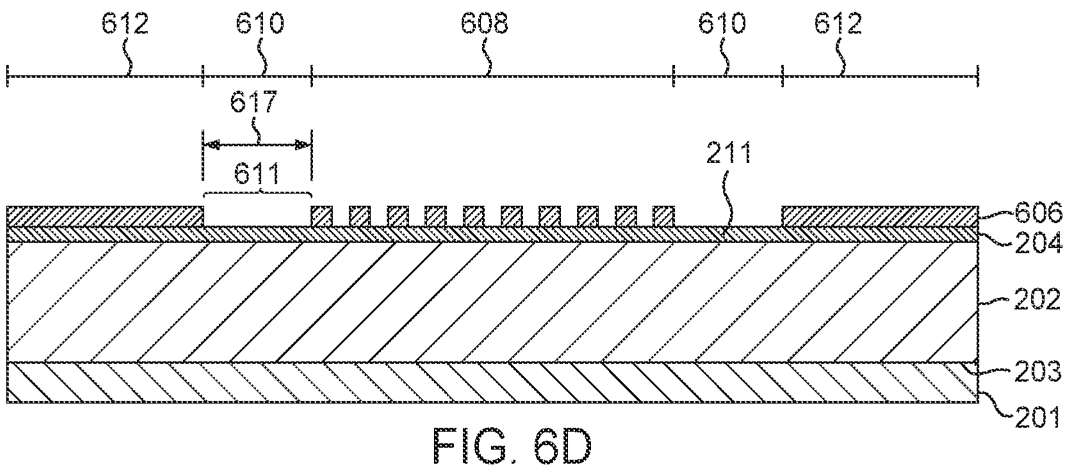
FIGS. 6D-6F are schematic, cross-sectional views of a substrate during the method for fabricating the optical devices according to an embodiment.
Figure 6E:
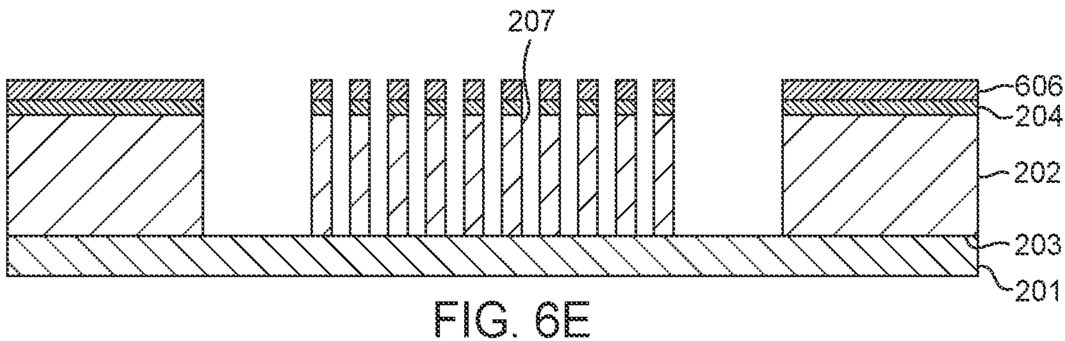
Figure 6F:
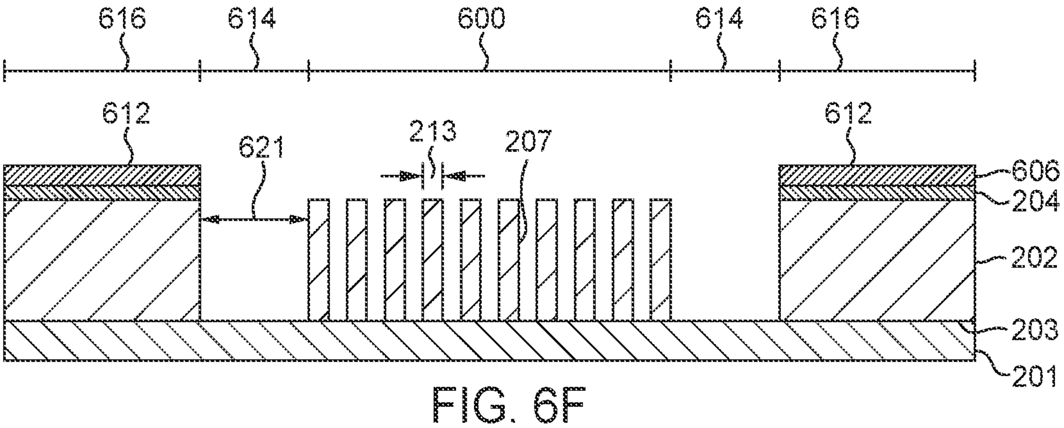

FIG. 4 is a flow diagram illustrating operations of a method 400 for fabricating one or more optical devices 500, 600. FIGS. 5A-5C are schematic, top views of a substrate 201, and FIGS. 5D-5F are schematic, cross-sectional views of a substrate 201 during the method 400 for fabricating the optical devices 500 according to one embodiment, which can be combined with other embodiments described herein. FIGS. 6A-6C are schematic, top views of a substrate 201, and FIGS. 6D-6F are schematic, cross-sectional views of a substrate 201 during the method 400 for fabricating the optical devices 600 according to another embodiment, which can be combined with other embodiments described herein.

At operation 401, as shown in FIGS. 5A and 5D, and FIGS. 6A and 6D, a photoresist material is disposed over the structure material layer 202. The structure material layer 202 is disposed over the surface 203 of the substrate 201. The photoresist material is developed to form a pattered photoresist 506, 606. The photoresist material may be disposed over the structure material layer 202 using a spin-on coating process. The photoresist material may include, but is not limited to, light-sensitive polymer containing materials. In one embodiment, which can be combined with other embodiments described herein, at operation 401, the pattered photoresist 506, 606 is disposed over one or more etch layers 204, such as hardmasks or etch stop layers, disposed over the structure material layer 202. Developing the photoresist material may include performing a lithography process, such as photolithography and digital lithography.

In one embodiment, which can be combined with other embodiments described herein, the patterned photoresist 506, 606 includes at least one device portion 508, 608 and at least one auxiliary portion 512, 612. In another embodiment, which can be combined with other embodiments described herein, the patterned photoresist 506, 606 includes at least one device portion 508, 608, at least one intermediate portion 510, 610, and at least one auxiliary portion 512, 612. Each intermediate portion 510, 610 is between the device portion 508, 608 and the auxiliary portion 512, 612. The at least one device portion 508, 608 exposes unmasked device portions 505 of the structure material layer 202. The auxiliary portion 512, 612 masks, i.e., covers, the structure material layer 202. The at least one intermediate portion 510, 610 exposes unmasked intermediate portions 511, 611 of the structure material layer 202 between the device portion 508, 608 and the auxiliary portion 512, 612. Each of the unmasked intermediate portions 511, 611 has an unmasked distance 517, 617 from the device portion 508, 608 to the auxiliary portion 512, 612. In one embodiment, which can be combined with other embodiments described herein, the unmasked distance 517 between each device portion 508 and each auxiliary portion 512 is constant. In another embodiment, which can be combined with other embodiments described herein, the unmasked distance 617 between each device portion 608 and each auxiliary portion 612 is varied.

At operation 402, as shown in FIGS. 5B and 5E, and FIGS. 6B and 6E, the unmasked device portions 505 and unmasked intermediate portions 511, 611 of the structure material layer 202 are etched. The etching the unmasked device portions 505 and unmasked intermediate portions 511, 611 of the structure material layer 202 includes at least one a dry etching process not limited to at least one of ion implantation, ion etching, reactive ion etching (RIE), directional RIE, plasma etching, and wet etching. Etching the unmasked device portions 505 and unmasked intermediate portions 511, 611 forms the device structures 207 of the optical device 500, 600, and exposes the surface 203 of substrate 201 in an intermediate region 514, 614 The auxiliary portion 512, 612 of the patterned photoresist 506, 606 remains over the structure material layer 202.

As shown in FIGS. 5C and 5D, and FIGS. 6C and 6F, each device portion 508, 608 corresponds to one of the optical devices 500, 600 having arrays of device structures 207 formed on or are integral with a surface 203 of substrate 201. Each intermediate portion 510, 610 corresponds to an intermediate region 514, 614 between the optical devices 500, 600 and an auxiliary region 516, 616. Each auxiliary portion 512, 612 corresponds to the auxiliary region 516, 616 of the substrate 201. The auxiliary region 516, 616 is defined by a space defined by each intermediate region 514, 614 and a periphery of the substrate 201. The auxiliary portion 512, 612 of the patterned photoresist 506, 606 is a dark-field mask over the auxiliary portion 512, 612.

In one embodiment, which can be combined with other embodiments described herein, unmasked portions 211 of the one or more etch layers 204 are etched prior to the unmasked device portions 505 and unmasked intermediate portions 511, 611 of the structure material layer 202. At operation 403, as shown in FIGS. 5C and 5D, and FIGS. 6C and 6F, the device portion 508, 608 of the patterned photoresist 506, 506 is removed. Removing the device portion 508, 608 may include a lithography process or etching process described herein. In the embodiments with the one or more etch layers 204, the one or more etch layers 204 are removed.

The unmasked distance 517 between each device portion 508 and each auxiliary portion 512 being constant provides loading of the patterned photoresist 506. The loading provides for endpoint detection during the etching of operation 402 and provides for a critical dimension 213 of the device structures 207 less than about 1000 nm, for example, less than about 500 nm, less than about 200 nm, less than about 100 nm or even less than about 20 nm. The unmasked distance 517 between each device portion 508 and each auxiliary portion 512 corresponds to an exposed distance 521 of the surface 203 between each intermediate region 514 and each auxiliary portion 512 that is constant. The constant exposed distance 521 provides control of optical interaction of the auxiliary portion 512 with light incident on the optical devices 500. The unmasked distance 617 between each device portion 608 and each auxiliary portion 612 being varied provides loading of the patterned photoresist 606. The loading provides for endpoint detection during the etching of operation 402 and provides for a critical dimension 213 of the device structures 207 less than about 1000 nm, for example, less than about 500 nm, less than about 200 nm, less than about 100 nm or even less than about 20 nm. The unmasked distance 617 between each device portion 608 and each auxiliary portion 612 corresponds to an exposed distance 621 of the surface 203 between each intermediate region 614 and each auxiliary portion 612 that is varied. The varied exposed distance 621 provides control of optical interaction of the auxiliary portion 612 with light incident on the optical devices 600. The dark-field mask of the auxiliary portion 512, 612 over the auxiliary portion 512, 612 functions as apertures that prevent beams from degrading the functionality and efficiency of the optical devices 500, 600 by prevention optical interaction of beams with the substrate outside of the optical devices 500, 600.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
disposing a structure material layer on a surface of a substrate;
forming a patterned photoresist over the structure material layer, the patterned photoresist having:
at least one device portion; and
at least one auxiliary portion, wherein each device portion and each auxiliary portion exposes unmasked portions of the structure material layer; and
etching the unmasked portions of structure material layer corresponding to each device portion and each auxiliary portion, wherein the etching the unmasked portions forms:
at least one optical device having one or more arrays of nanostructures disposed on or integral with a surface of a substrate, each of the nanostructures having:
a device critical dimension defined by a width of the nanostructures; and
a device gap defined as a distance between adjacent nanostructures; and
an intermediate region surrounding each optical device, the intermediate region exposing the surface of the substrate, the intermediate region extending a distance greater than the device critical dimension and the device gap, the intermediate region void of nanostructures.

2. The method of claim 1, wherein the device critical dimension is less than 1000 nanometers (nm).

3. The method of claim 1, wherein the at least one auxiliary portion has a dark-field mask disposed on or integral with the surface of the substrate.

4. The method of claim 3, wherein the dark-field mask is at least one of a photoresist or hardmask disposed over an auxiliary structure disposed on the surface of the substrate.

5. The method of claim 4, wherein the hardmask includes at least one of chromium (Cr), silver (Ag), silicon nitride (Si3N4), silicon dioxide (SiO2), titanium nitride (TiN), or carbon (C) containing materials.

6. The method of claim 4, wherein the nanostructures and the auxiliary structure consist of a same material.

7. The method of claim 1, wherein the intermediate region surrounding each optical device is equal in size.

8. The method of claim 1, wherein the intermediate region surrounding each optical device is inconsistent in size.

9. The method of claim 1, wherein the nanostructures comprise one or more of titanium dioxide (TiO2), zinc oxide (ZnO), tin dioxide (SnO2), aluminum-doped zinc oxide (AZO), fluorine-doped tin oxide (FTO), cadmium stannate (tin oxide) (CTO), zinc stannate (tin oxide) (SnZnO3), silicon nitride (Si3N4), niobium oxide ($Nb_2O_5$), or silicon containing materials.

10. A method, comprising:
disposing a structure material layer on a surface of a substrate;
forming a patterned photoresist over the structure material layer, the patterned photoresist having:
at least one device portion; and
at least one auxiliary portion, wherein each device portion of the at least one device portion and each auxiliary portion of the at least one auxiliary portion exposes unmasked portions of the structure material layer; and
etching the unmasked portions of the structure material layer corresponding to the each device portion and the each auxiliary portion, wherein the etching the unmasked portions forms:
at least one optical device having one or more arrays of device structures corresponding to each device portion disposed on or integral with a surface of the substrate, wherein each device structure comprises:
a device critical dimension defined by a width of the device structures the device critical dimension less than 1000 nanometers (nm); and
a device gap defined as a distance between adjacent device structures; and
the at least one auxiliary portion defined by an intermediate region, the intermediate region disposed around a periphery of each optical device, the at least one auxiliary portion having auxiliary structures corresponding to the each auxiliary portion, the at least one auxiliary portion having a distance greater than a width of the device structures and a width of the auxiliary structures.

11. The method of claim 10, wherein a width of the unmasked portions is the same for both the at least one device portion and the at least one auxiliary portion.

12. The method of claim 11, wherein a device critical dimension of the device structures is equal to an auxiliary critical dimension of the auxiliary structures.

13. The method of claim 10, wherein a width of the unmasked portions of the auxiliary portion is greater than the width of the unmasked portions of the at least one device portion.

14. The method of claim 13, wherein an auxiliary critical dimension of the 14 auxiliary structures is greater than a device critical dimension of the device structures.

15. The method of claim 10, wherein the structure material layer comprises one or more titanium dioxide ($TiO_2$), zinc oxide (ZnO), tin dioxide ($SnO_2$), aluminum-doped zinc oxide (AZO), fluorine-doped tin oxide (FTO), cadmium stannate (tin oxide) (CTO), zinc stannate (tin oxide) ($SnZnO_3$), silicon nitride ($Si_3N_4$) and silicon a-Si containing materials.

16. The method of claim 10, wherein the etching the unmasked portions comprises one or more of ion implantation, ion etching, reactive ion etching (RIE), directional RIE, plasma etching, and wet etching.

17. A method, comprising:

disposing a structure material layer on a surface of a substrate;

forming a patterned photoresist over the structure material layer, the patterned photoresist having:

at least one device portion; and at least one auxiliary portion, wherein each device portion and each auxiliary portion exposes unmasked portions of the structure material layer; and etching the unmasked portions of structure material layer corresponding to each device portion and each auxiliary portion, wherein the etching the unmasked portions forms:

at least one optical device having one or more arrays of nanostructures disposed on or integral with a surface of a substrate, each of the nanostructures having:

a device critical dimension defined by a width of the nanostructures, the device critical dimension less than 1000 nanometers (nm); and a device gap defined as a distance between adjacent nanostructures; and an auxiliary region defined by an intermediate region disposed around a periphery of each optical device, the intermediate region having a width greater than the device critical dimension and the device gap, the auxiliary region void of nanostructures, the auxiliary region having one or more arrays of auxiliary structures disposed on or integral with the surface of the substrate; each of the auxiliary structures having:

an auxiliary critical dimension defined by a width of the auxiliary structures, the auxiliary critical dimension being smaller than the width of the intermediate region; and an auxiliary gap defined as a distance between adjacent auxiliary structures, the auxiliary gap being smaller than the width of the intermediate region.

18. The method of claim 17, wherein the device critical dimension is less than the auxiliary critical dimension.

19. The method of claim 17, wherein the device critical dimension is equal to the auxiliary critical dimension.

20. The method of claim 17, wherein at least one of the nanostructures or the auxiliary structures comprise one or more of titanium dioxide ($TiO_2$), zinc oxide (ZnO), tin dioxide ($SnO_2$), aluminum-doped zinc oxide (AZO), fluorine-doped tin oxide (FTO), cadmium stannate (tin oxide) (CTO), zinc stannate (tin oxide) ($SnZnO_3$), silicon nitride ($Si_3N_4$), niobium oxide ($Nb_2O_5$), or silicon containing materials.

* * * * *